(12) United States Patent
Anderson et al.

(10) Patent No.: US 9,606,843 B2
(45) Date of Patent: Mar. 28, 2017

(54) RUNTIME OPTIMIZATION OF MULTI-CORE SYSTEM DESIGNS FOR INCREASED OPERATING LIFE AND MAXIMIZED PERFORMANCE

(71) Applicant: QUALCOMM Incorporated, San Diego, CA (US)

(72) Inventors: Jon James Anderson, Boulder, CO (US); Richard Alan Stewart, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 14/166,984

(22) Filed: Jan. 29, 2014

(65) Prior Publication Data

US 2015/0169382 A1 Jun. 18, 2015

Related U.S. Application Data

(60) Provisional application No. 61/917,487, filed on Dec. 18, 2013.

(51) Int. Cl.
*G06F 9/45* (2006.01)
*G06F 9/50* (2006.01)

(52) U.S. Cl.
CPC ............ *G06F 9/5094* (2013.01); *G06F 9/505* (2013.01); *G06F 9/5066* (2013.01); *G06F 9/5077* (2013.01)

(58) Field of Classification Search
None
See application file for complete search history.

(56) References Cited

U.S. PATENT DOCUMENTS 6,993,767 B2   1/2006   Brenner et al.
7,802,073 B1   9/2010   Cheng et al.
(Continued)

FOREIGN PATENT DOCUMENTS

WO   2013126066 A1   8/2013

OTHER PUBLICATIONS

Partial International Search Report—PCT/US2014/069380—ISA/EPO—Mar. 12, 2015.
(Continued)

*Primary Examiner* — Chuck Kendall
(74) *Attorney, Agent, or Firm* — The Marbury Law Group, PLLC

(57) ABSTRACT

Aspects include computing devices, systems, and methods for adjusting the assignment of tasks to processor cores in a multi-core processing system to increase operating life and maximize device performance by wear-leveling the processor cores. A reliability engine may be configured to collect operation or built in self test data of thermal output and current leakage, and historical operation time for a group of equivalent processor cores configured for the same purpose. Collected data may be applied to a weighted function to determine priorities for each equivalent processor core in the group. The reliability engine may rearrange a virtual processor identification translation table according to the priorities of the equivalent processor cores. A high level operating system may issue a process request specifying a processor core and the specified processor core may be translated to a different processor core according to the order of processor cores dictated by the priorities.

30 Claims, 11 Drawing Sheets

(56) References Cited

U.S. PATENT DOCUMENTS

| | | |
|---|---|---|
| 9,298,504 B1 | 3/2016 | Vincent |
| 2004/0221193 A1 | 11/2004 | Armstrong et al. |
| 2006/0095913 A1 | 5/2006 | Bodas et al. |
| 2006/0230308 A1 | 10/2006 | Barlow et al. |
| 2009/0037911 A1 | 2/2009 | Ahuja et al. |
| 2009/0055826 A1 | 2/2009 | Bernstein et al. |
| 2009/0240979 A1 | 9/2009 | Campini et al. |
| 2009/0327680 A1 | 12/2009 | Dale et al. |
| 2010/0037038 A1 | 2/2010 | Bieswanger et al. |
| 2010/0107166 A1 | 4/2010 | Topaloglu |
| 2011/0173432 A1 | 7/2011 | Cher et al. |
| 2011/0239016 A1 | 9/2011 | Boyd et al. |
| 2012/0109339 A1 | 5/2012 | Chang |
| 2012/0317568 A1 | 12/2012 | Aasheim |
| 2013/0047166 A1 | 2/2013 | Penzes et al. |
| 2013/0067132 A1 | 3/2013 | Guddeti et al. |
| 2013/0086395 A1 | 4/2013 | Liu |
| 2013/0132535 A1 * | 5/2013 | Basso .................. G06F 1/3209 709/221 |
| 2013/0155073 A1 | 6/2013 | Khodorkovsky et al. |
| 2014/0115588 A1 | 4/2014 | Traut et al. |
| 2014/0173595 A1 | 6/2014 | Anand et al. |
| 2014/0181596 A1 | 6/2014 | Rusu et al. |
| 2014/0181829 A1 | 6/2014 | Hathaway et al. |
| 2014/0189704 A1 | 7/2014 | Narvaez et al. |
| 2015/0169363 A1 | 6/2015 | Anderson |

OTHER PUBLICATIONS

International Search Report and Written Opinion—PCT/US2014/069380—ISA/EPO—Aug. 12, 2015.

\* cited by examiner

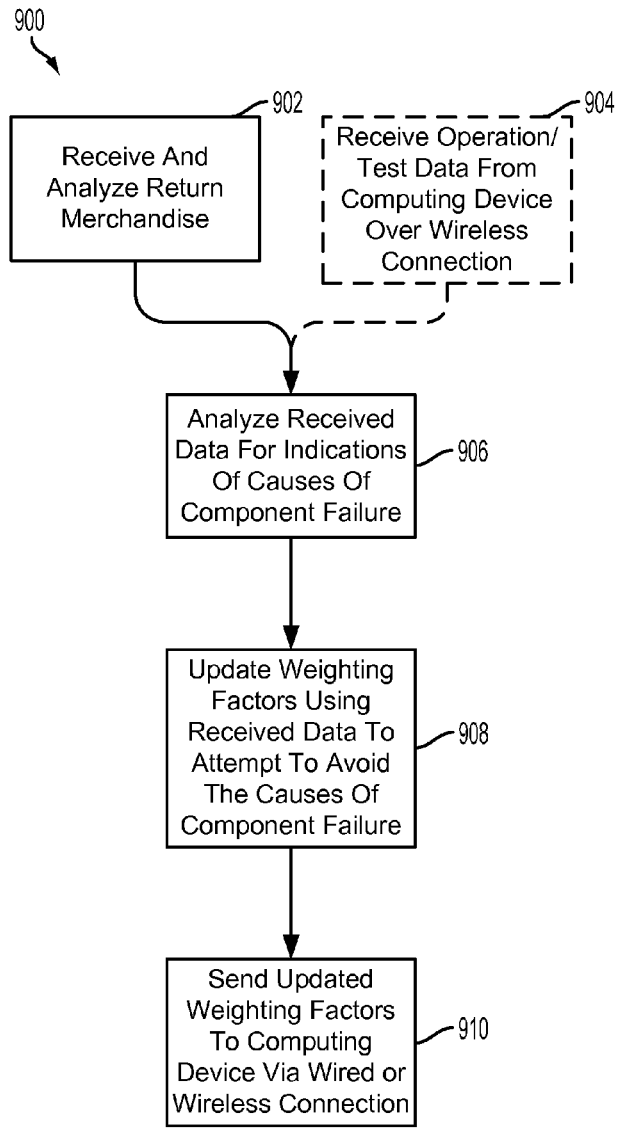
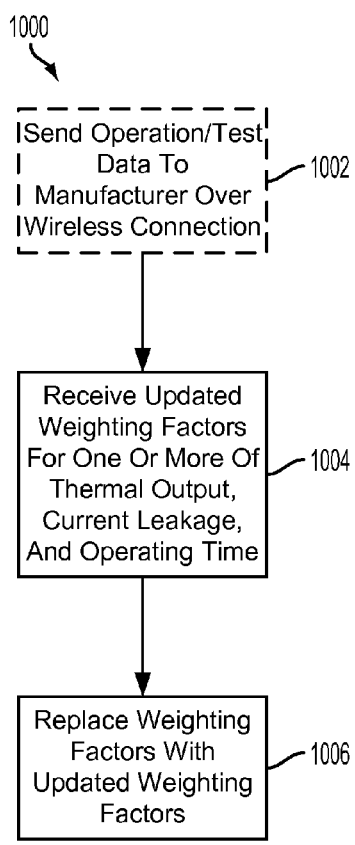
FIG. 9
FIG. 10

RUNTIME OPTIMIZATION OF MULTI-CORE SYSTEM DESIGNS FOR INCREASED OPERATING LIFE AND MAXIMIZED PERFORMANCE

RELATED APPLICATIONS

This application claims the benefit of priority to U.S. Provisional Application No. 61/917,487 entitled "Runtime Optimization of Multi-core System Designs for Increased Operating Life and Maximized Performance" filed Dec. 18, 2013, the entire contents of which are hereby incorporated by reference for all purposes.

BACKGROUND

The operating life of a high performance digital system is, in part, a function of heating and cooling cycles of the system's components. Failure of a system's components can cripple or render the system inoperable. One such component is the system's processor, including individual processor cores of a multi-core processor. When constant and extreme thermal cycling occurs, the operating life of the system's components can be reduced as a result of physical damage to the die, packaging, or bonds of the component.

Electronic components, such as processors, that are produced in large manufacturing lots tend to exhibit differences in their internal resistance which leads to differences in the amount of current that is used per unit time for a given operating state. Due to such manufacturing variability, if there is more than one of such component in a computing device, one or a few of them are likely to have greater current usage than the others, and so are referred to herein as "higher leakage components." Higher leakage components tend to exhibit lower performance levels compared to their lower leakage counterparts. Higher leakage components also tend to run at higher temperatures than the lower leakage components due to higher internal resistance. The higher temperatures of higher leakage components may lead to reduced operating life compared to lower leakage components. Thermal cycling may change the leakage characteristics of the components overtime, and thus the differences in operating temperature and operating life may increase as the computing device ages.

SUMMARY

The methods and apparatuses of various aspects provide circuits and methods for assigning processing tasks to processor cores within a multi-core processor in order to extend an operating life of the multi-core processor. Aspect methods may include obtaining information relevant to wear out regarding each of the processor cores within the multi-core processor, calculating a priority for each of the processor cores based on the obtained information relevant to wear out, and reassigning processor requests to specific processor cores based on the calculated priority. In an aspect, obtaining information relevant to wear out regarding each of the processor cores within the multi-core processor may include measuring one or more of a temperature, cumulative usage, and a current leakage of the processor cores under normal operations. In an aspect, obtaining information relevant to wear out regarding each of the processor cores within the multi-core processor may include determining whether the processor cores are active, providing a test workload to each of the processor cores in response to determining that the processor cores are inactive, measuring one or more of thermal output and current leakage of the processor cores under the test workload individually or for groups of the processor cores in response to providing the test workload, measuring one or more of thermal output and current leakage of the processor cores under normal operation individually or for groups of processor cores in response to determining that the processor cores are active, and retrieving historical operating time for each of the processor cores.

In an aspect, calculating a priority for each of the processor cores based on the obtained information relevant to wear out may include calculating the priority for each of the processor cores by multiplying weighting factors times the measured thermal output, the measured current leakage, and the historical operating time and summing the products. An aspect method may include receiving over a network connection updated weighting factors, and updating the weighting factors used in calculating a priority for each of the processor cores with the updated weighting factors.

In an aspect, reassigning processor requests to specific processor cores based on the calculated priority may include receiving a process request from a high level operating system specifying a first virtual identifier for a first processor core, mapping the process request to a second processor core, and returning a result of the process request to the high level operating system as if the first processor core generated the result of the process request.

An aspect method may include determining whether a historical operating time for any of the processor cores exceeds an operating time threshold, grouping those processor cores that exceed the operating time threshold into a first group of processor cores and grouping those processor cores that do not exceed the operating time threshold into a second group of processor cores, and ordering associations between virtual identifiers for each of the processor cores and each of the processor cores according to the priorities calculated for each of the processor cores for the first group of processor cores separately from associations for the second group of processor cores.

In an aspect, reassigning processor requests to specific processor cores based on the calculated priority may include ordering associations between virtual identifiers for each of the processor cores and physical identifiers for each of the processor cores according to the priorities calculated for each of the processor cores, mapping process requests received from a high level operating system according to the ordered associations between the virtual identifiers and the physical identifiers for each of the processor cores, and returning results of process request to the high level operating system as if the processor cores identified by the high level operating system had generated the results of the process requests.

An aspect method may include determining whether a historical operating time for any of the processor cores exceeds an operating time threshold, and grouping those processor cores that exceed the operating time threshold into a first group of processor cores and grouping those processor cores that do not exceed the operating time threshold into a second group of processor cores, in which ordering associations between virtual identifiers for each of the processor cores and physical identifiers for each of the processor cores according to the priorities calculated for each of the processor cores comprises ordering associations for the first group of processor cores separately from associations for the second group of processor cores.

An aspect includes an apparatus including a multi-core processor having multiple processor cores in which the multi-core processor is configured with processor-executable instructions to perform operations of one or more of the aspect methods described above.

An aspect includes a computing device having a multi-core processor with multiple processor cores including means for performing functions of one or more of the aspect methods described above.

An aspect includes a non-transitory processor-readable medium having stored thereon processor-executable instructions configured to cause a multi-core processor to perform operations of one or more of the aspect methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

FIG. 9 is a process flow diagram illustrating an aspect method for updating weighting values for use in determining core priorities based on operational experience.

FIG. 10 is a process flow diagram illustrating an aspect method for updating weighting values for use in determining core priorities based on operational experience.

DETAILED DESCRIPTION

Figure 1:
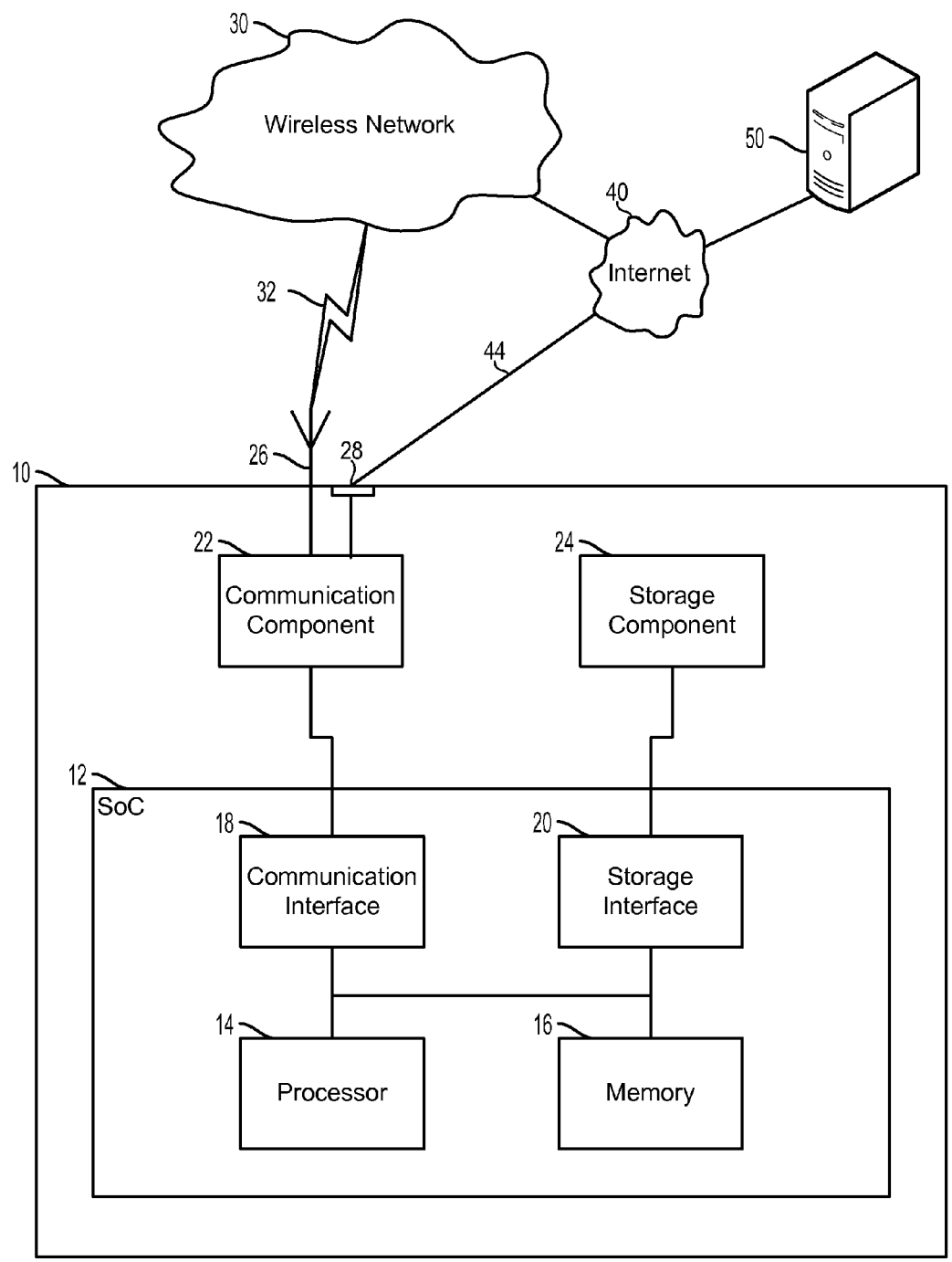
FIG. 1 is a component block diagram of an example computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" is used herein to refer to any one or all of cellular telephones, smartphones, personal or mobile multi-media players, personal data assistants (PDA's), personal computers, laptop computers, tablet computers, smartbooks, ultrabooks, palm-top computers, wireless electronic mail receivers, multimedia Internet enabled cellular telephones, wireless gaming controllers, desktop computers, compute servers, data servers, telecommunication infrastructure rack servers, video distribution servers, application specific servers, and similar personal or commercial electronic devices which include a memory, and one or more programmable multi-core processors.

The terms "system-on-chip" (SoC) and "integrated circuit" are used interchangeably herein to refer to a set of interconnected electronic circuits typically, but not exclusively, including multiple hardware cores, a memory, and a communication interface. The hardware cores may include a variety of different types of processors, such as a general purpose multi-core processor, a multi-core central processing unit (CPU), a multi-core digital signal processor (DSP), a multi-core graphics processing unit (GPU), a multi-core accelerated processing unit (APU), and a multi-core auxiliary processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon. Such a configuration may also be referred to as the IC components being on a single chip.

A computing device may include multiple equivalent processor cores, such that each core is constructed for the same purposes and/or to have the same capabilities. Even within a single multi-core processor chip, equivalent processor cores may have slightly different physical and performance characteristics due to intrinsic, natural variations in the equivalent processor cores' component materials. These differences may introduce variability in the processing speed, power consumption, and thermal performance of each processor core in a computing device. Processor cores may wear differently over time due to variable usage, heat cycling, and operating temperature due to their characteristic current leakage. Excessive wear on one or more processor cores may cause the computing device to fail even though not all processor cores failed.

In a computing device in which all equivalent processor cores may not always run concurrently, the aspects enable increasing the operating life of the equivalent processor cores, and thereby the computing device, by directing tasks to the cores in a priority order determined by their usage history as well as current performance characteristics. An aspect may also improve the performance of the system by directing tasks to the cores such a manner. The characteristics of the processor cores may vary as they wear over time, so manufacturer data may not be reliable. The current characteristics of the processor cores may be determined by measuring thermal output and/or current leakage for normally operating processor cores, or for processor cores under a built in self test designated for producing the results necessary to determine the current characteristics. Historical operational time for the processor cores may also be retrieved. The current characteristic data may be applied to a weighted function to produce priorities for the processor cores. The priorities may be used to assign processes and processing tasks to the processor cores based on their level of wear. For example, the processor cores with the least wear may be prioritized to run more processes as they are less likely to fail.

In an aspect the weighted factors used in the function for determining the priorities of the processor cores may be updated over the air so that original equipment manufacturers (OEMs), wireless service providers, or chipset suppliers can revise these weighted factors and improve system reliability and performance in fielded units. The updating the weighted factors may be based on information obtained from examining returned merchandise (e.g., devices failing within the warranty period), as well as operational and test data from fielded units.

FIG. 1 illustrates a system having a computing device 10 in communication with a processor manufacturer server 50. The computing device 10 may include an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 or connecting to a wired connection 44 to the Internet 40. The processor 14 may include any of a variety of hardware cores as described above. The processor 14 may further include a number of processor cores. The SoC 12 may include one or more processors 14. The computing device 10 may include one or more SoCs 12, thereby increasing the number of processors 14 and processor cores. The computing device 10 may also include processor cores 14 that are not associated with an SoC 12. The processors 14 may each be configured for specific purposes that may be the same or different from other processors 14 of the computing device 10. Processors 14 configured for the same purpose may be considered equivalent processors. Further, equivalent processors 14 may be configured to have similar performance characteristics. Further, individual processors 14 may be multi-core processors as described below with reference to FIG. 2.

The memory 16 of the SoC 12 may be a volatile or non-volatile memory configured for storing data and processor-executable code for access by the processor 14. In an aspect, the memory 16 may be configured to, at least temporarily, store a data structure, such as a table as described below with reference to FIG. 4, for relating and translating between a high level operating system processor core identification to a hardware processor core priority. As discussed in further detail below, each of the processor cores of the processor 14 may be prioritized or given and identification value that is shared with a high level operating system running on the computing device 10.

The computing device 10 and/or SoC 12 may include one or more memories 16 configured for various purposes. In an aspect, one or more memories 16 may be configured to be dedicated to storing the data structure for storing core priority information, such that the information of the data structure may be accessed by one or more processors 14. When the memory 15 storing the data structure is non-volatile, the memory 16 may retain the information of the data structure even after the power of the computing device 10 has been shut off. When the power is turned back on and the computing device 10 reboots, the memory 16 may be available to the computing device 10 to provide the information of the data structure. In another aspect, the memory 16 may also store and maintain weighting values, and historical processor core operation and/or test data, which may be used to assign the hardware processor core priorities or to send to the processor core manufacturer 28 for use in updating the weighting values.

The communication interface 18, communication component 22, antenna 26 and/or network interface 28, may work in unison to enable the computing device 10 to communicate over a wireless network 30 via a wireless connection 32, and/or a wired network 44 with the processor core manufacturer server 50. The wireless network 30 may be implemented using a variety of wireless communication technologies, including, for example, radio frequency spectrum used for wireless communications, to provide the computing device 10 with a connection to the Internet 40 by which it may exchange data with the processor core manufacturer server 50. In an aspect, a wireless network 30 and/or a wired connection 44 to the Internet 40 may be used to communicate operational data and/or test data of the computing device 10 to the processor core manufacturer server 50. In another aspect, the wireless network 30 and/or wired connection 44 to the Internet 40 may be used to communicate updated weighting values, for use in assigning the hardware processor core priorities, from the processor core manufacturer server 50 to the computing device 10.

The storage interface 20 and the storage component 24 may work in unison to allow the computing device 10 to store data on a non-volatile storage medium. The storage component 24 may be configured much like an aspect of the memory 16 in which the storage component 24 may store the data structure, such that the information of the data structure may be accessed by one or more processors 14. The storage component 24, being non-volatile, may retain the information of the data structure even after the power of the computing device 10 has been shut off. When the power is turned back on and the computing device 10 reboots, the storage component 24 may be available to the computing device 10 to provide the information of the data structure. In another aspect, the storage component 24 may also store and maintain weighting values, and historical processor core operation and/or test data, which may be used to assign the hardware processor core priorities or to send to the processor core manufacturer 28 for use in updating the weighting values. The storage interface 20 may control access the storage device 24 and allow the processor 14 to read data from and write data to the storage device 24.

It should be noted that some or all of the components of the computing device 10 may be differently arranged and/or combined while still serving the necessary functions. Moreover, the computing device 10 may not be limited to one of each of the components, and multiple instances of each component, in various configurations, may be included in the computing device 10

Figure 2:
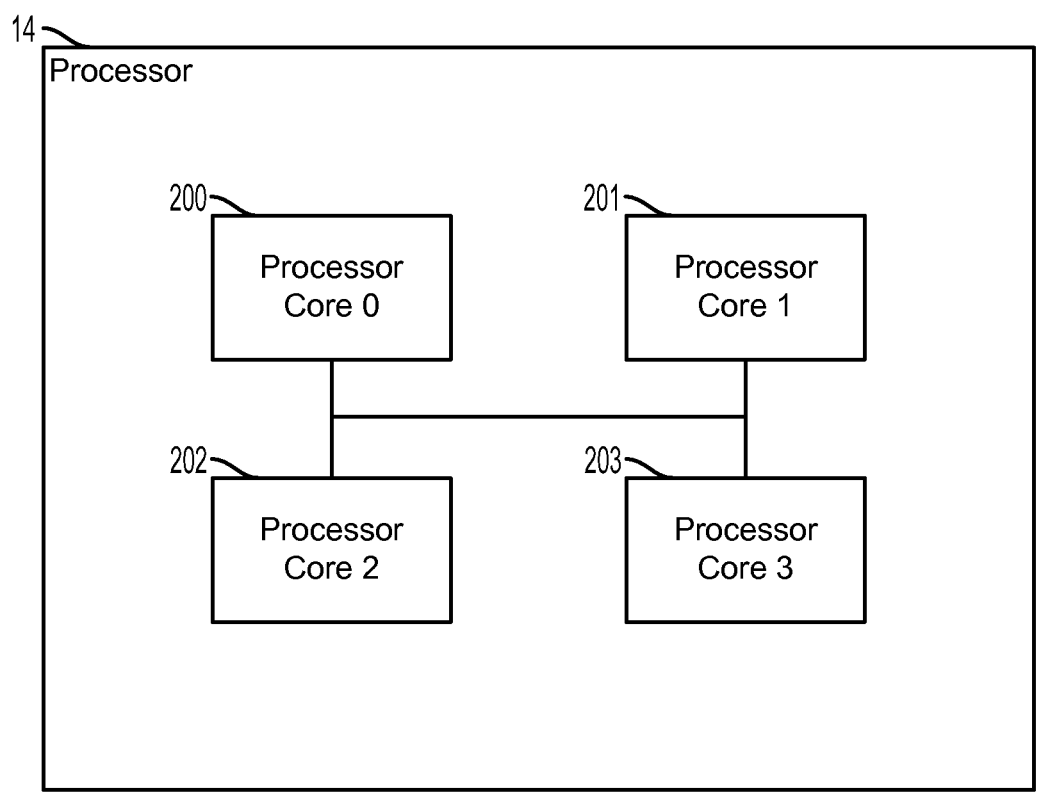
FIG. 2 is a component block diagram of an example multi-core processor suitable for implementing an aspect.

FIG. 2 illustrates a multi-core processor 14 suitable for implementing an aspect. The multi-core processor 14 may have a plurality of equivalent processor cores 200, 201, 202, 203. As described further herein, the processor cores 200, 201, 202, 203 are equivalent in that, processor cores 200, 201, 202, 203 of a single processor 14 may be configured for the same purpose and to have the same performance characteristics. For example, the processor 14 may be a general purpose processor, and the processor cores 200, 201, 202, 203 may be equivalent general purpose processor cores. Alternatively, the processor 14 may be a graphics processing unit or a digital signal processor, and the processor cores 200, 201, 202, 203 may be equivalent graphics processor cores or digital signal processor cores, respectively. Through variations in the manufacturing process and materials, it may result that the performance characteristics of the processor cores 200, 201, 202, 203 may differ from processor core to processor core, within the same multi-core processor 14 or in another multi-core processor 14 using the same designed processor cores. In the example illustrated in FIG. 2, the multi-core processor 14 includes four processor cores 200, 201, 202, 203, (i.e., processor core 0, processor core 1, processor core 2, and processor core 3). For ease of explanation, the examples herein may refer to the four processor cores 200, 201, 202, 203 illustrated in FIG. 2. However, it should be noted that FIG. 2 and the four processor cores 200, 201, 202, 203 illustrated and described herein are in no way meant to be limiting. The computing device 10, the SoC 12, or the multi-core processor 14 may individually or in combination include fewer or more than the four processor cores 200, 201, 202, 203.

Figure 3:
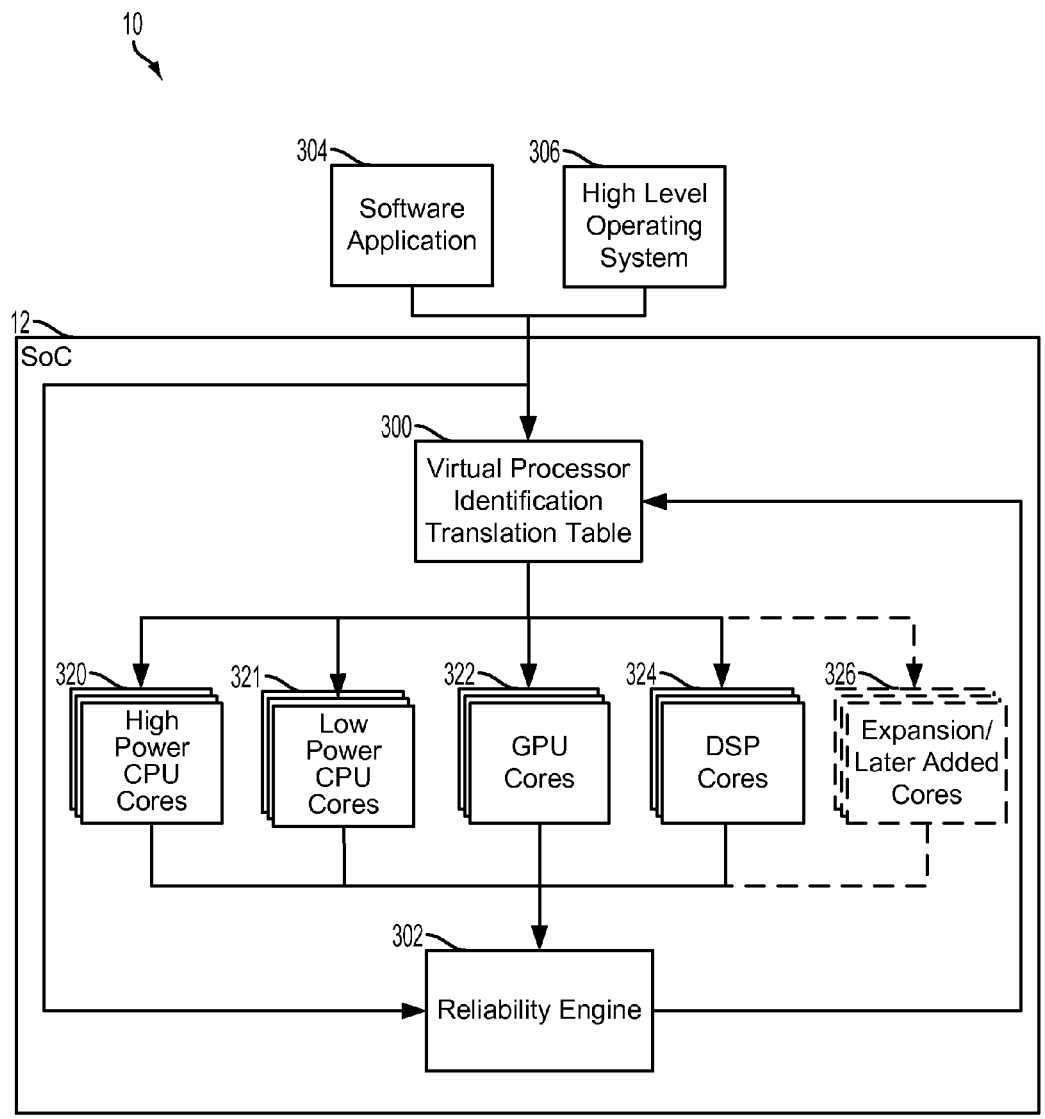
FIG. 3 is a functional and component block diagram of a system-on-chip suitable for implementing an aspect.

FIG. 3 illustrates a computing device 10 having an SoC 12 including multiple processor cores 320, 321, 322, 324, 326, and a reliability engine 302 for runtime optimization of multi-core system designs for increased operating life and maximized performance, in accordance with an aspect. The computing device 10 may include the SoC 12 having the processor cores 320, 321, 322, 324, 326, as well as a virtual processor identification translation table 300 and a reliability engine 302. The computing device 10 may also include software applications 304 and a high level operating system 306 which may be configured to communicate with the components of the SoC 12.

In FIG. 3, different types of multi-core processors are illustrated, including a high performance/high leakage multi-core general purpose/central processing unit (CPU) 320 (referred to as a "high power CPU core" in the figure), low performance/low leakage multi-core general purpose/central processing unit (CPU) 321 (referred to as a "low power CPU core" in the figure), a multi-core graphics processing unit (GPU) 322, a multi-core digital signal processor (DSP) 324, and other multi-core computational units 326. Recent computing device architectures are including a cluster of general purpose CPUs that exhibit high performance but at the cost of high current leakage, and another cluster of CPUs that exhibit lower performance but lower current leakage. The two clusters of CPUs may maintain coherent caches, and therefore both clusters of CPUs may be up and running simultaneously. For purposes of this disclosure each cluster of CPUs may be prioritized independently. Also, for purposes of this disclosure, computational elements with similar characteristics are generally grouped together; however, this is not a requirement. For example, DSP clusters may be distinguished in a similar manner, and thus the aspects include distinguishing computing devices on other axes to distinguish similar processing elements.

FIG. 3 also illustrates that processor cores 326 may be installed in the computing device after it is sold, such as an expansion or enhancement of processing capability or as an update to the computing device. After-market expansions of processing capabilities are not limited to central processor cores, and may be any type of computing module that may be added to or replaced in a computing system, including for example, additional, upgraded or replacement modem processors, additional or replacement graphics processors (GPUs), additional or replacement audio processors, and additional or replacement DSPs, any of which may be installed as single-chip-multi-core modules or clusters of processors (e.g., on an SoC). Also, in servers, such added or replaced processor components may be installed as processing modules (or blades) that plug into a receptacle and wiring harness interface Implications of adding additional or replacement processor cores to the computing device are discussed below with reference to FIG. 6.

Each of the groups of processor cores illustrated in FIG. 3 may be part of a multi-core processor 14 as described above. Moreover, these five example multi-core processors (or groups of processor cores) are not meant to be limiting, and the computing device 10 or the SoC 12 may individually or in combination include fewer or more than the five multi-core processors 320, 321, 322, 324, 326 (or groups of processor cores), including types not displayed in FIG. 3.

The reliability engine 302 may be implemented in hardware, software, or a combination of hardware and software. The reliability engine may be configured to analyze data relating to the various processor cores 320, 321, 322, 324, 326 and modify the hardware processor core priorities to increase operating life and maximized performance of the various processor cores 320, 321, 322, 324, 326 and thereby the computing device 10. As described above, processor cores in multi-core processors may wear unevenly. Certain processor cores by virtue of processor, SoC, and/or computing device design may be subject to different operation conditions from other operating cores in the same computing device 10. In an aspect, heat cycling of the processor cores may weaken components of the processor cores causing them to fail. Some processor cores may be positioned within a computing device such that they experience a greater rate and/or degree of heat cycling between hotter and colder temperatures. The differences in heat cycling may also result from use when some processor cores are used more than others. This may result from the types of processes run on a computing device 10 and how the software 302 and high level operating system 304 are configured to specify certain processor cores. Also, processor cores with higher current leakage run at higher temperatures, relative to lower current leakage processor cores. Higher current leakage processor cores also run at lower performance levels relative to their lower current leakage counterparts. Thermal cycling changes the current leakage characteristics of the processor cores overtime.

To delay the potential damage caused by the thermal cycling, the reliability engine 302 may analyze data relating to each of the processor cores in multi-core processors 320, 321, 322, 324, 326 and modify the hardware processor core priorities, changing the frequency with which certain processor cores are used. The hardware processor core priorities may also act as physical identifiers for the processor cores.

Since the data relating to the processor cores may differ under varying conditions and generally change overtime due to the wear on the processor cores, it may be insufficient to rely on manufacturer data for the processor cores. The reliability engine 302 may use measured data of the various processor cores, including sensor data captured by sensors located at or close to the multi-core processors 320, 321, 322, 324, 326. In an aspect, the measured data may be captured during normal operation of the multi-core processors 320, 321, 322, 324, 326. In another aspect, when processor cores are idle, or in a quiescent state, such as during boot time of the computing device 10, the computing device may run a built in self test for selected processor cores. The built in self test may load a preset routine or workload on the processor core being tested and measure various performance parameters, such as processing time, voltage drop, current draw, temperature rise, etc. In either the normal operation or the built in self test the thermal output and the current leakage of the processor cores may be captured for at least the selected processor cores. Other data related to the processor cores may be retrieved from the memory 16, the storage component 24, or other dedicated components for retaining or determining the operational time of the individual processor cores and the weighting factors.

Using the data related to the processor cores, the reliability engine 302 may calculate new hardware processor core priorities for the selected processor cores. The hardware processor core priority for each processor core may be a function of one or more of the thermal output, current leakage and operational time for the individual processor core, and their respective weighting factors. The types of data to be used in the function or algorithm used to assign priorities to processor cores may include thermal output, current leakage and operational time, using only selected types, or all types may be used and certain types may be rendered irrelevant by using a weighting factor of zero for the undesired type. The function or algorithm for calculating the priorities may be, for example, as summation of one or more of the types of data augmented by first multiplying each type by its respective weighting factor. The units for each type of data may vary, and operational time may be expressed in percentage of time the processor core is operational while the multi-core processor 14 is operational. The results of the function or algorithm for each processor core may be compared and the priorities determined according to the numerical order of the results of the function. For example, the processor core with the lowest valued result may indicate the least amount of wear and may be given the highest priority. The next lowest valued result may indicate the next least amount of wear and the associated processor core may be given the next highest priority, and so on for all of the processor cores for which the function result is calculated. The processor cores may be selected in groups of equivalent processor cores, and the hardware processor core priorities may only apply within the groups.

The virtual processor identification translation table 300 may be implemented in hardware, software, or a combination of hardware and software. The virtual processor identification translation table 300 may be configured to relate the high level operating system processor core identification to the hardware processor core priority. The high level operating system processor core identification (or core ID) is how the software applications 304 and high level operating system 306 identify the processor cores that will handle specific processing requests, threads, or tasks. The high level operating system processor core identification may act as a virtual identifier for the processor cores. In an aspect, the software applications 304 and high level operating system 306 may be programmed to identify certain processor cores by certain high level operating system processor core identifications. In another aspect, upon booting the computing device 10, or starting the software applications 304 or high level operating system 306, the computing device may instruct the software applications 304 and high level operating system 306 as to which processor cores are associated with which high level operating system processor core identifications. These associations may be static and programmed into the firmware, such as the BIOS, of the computing device 10. Thus, when the software applications 304 and high level operating system 306 make a process request to a particular processor core, they may do so by specifying the high level operating system processor core identification for the particular processor core.

However, the computing device 10 may change priorities of the processor cores, as described further below. The computing device 10 may change the priorities to increase operating life and maximize performance of the processor cores. Changing the priorities of the processor cores may result in the high level operating system processor core identification being associated with a processor core that the computing device 10 does not intend to run the requested process. The virtual processor identification translation table 300 may track the changes in the priorities of the processor cores and associate the high level operating system processor core identifications with the appropriately prioritized processor core. To accomplish this, the virtual processor identification translation table 300 may receive the updated hardware processor core priorities calculated by the reliability engine 302. The virtual processor identification translation table 300 may also associate the high level operating system processor core identifications with the corresponding hardware processor core priority, and update the associations as the hardware processor core priorities change. When, a process request is received specifying a particular high level operating system processor core identification, the computing device may use the virtual processor identification translation table 300 to assign the process to the appropriately prioritized processor core. A table is used herein to describe this feature of the computing device 10, but the virtual processor identification translation may be implemented using a variety of different hardware, data structures, and software algorithms that may achieve the same function as described above. In an aspect, one or more virtual processor identification translation tables 300 may be implemented for numerous groups of processor cores. For example, each group of a type of processor cores, such as a multi-core general purpose CPU 320, 321, a multi-core GPU 322, a multi-core DSP 324, and other multi-core computational units 326, may be combined or separated in various configurations into one or more virtual processor identification translation tables 300.

Figure 4:
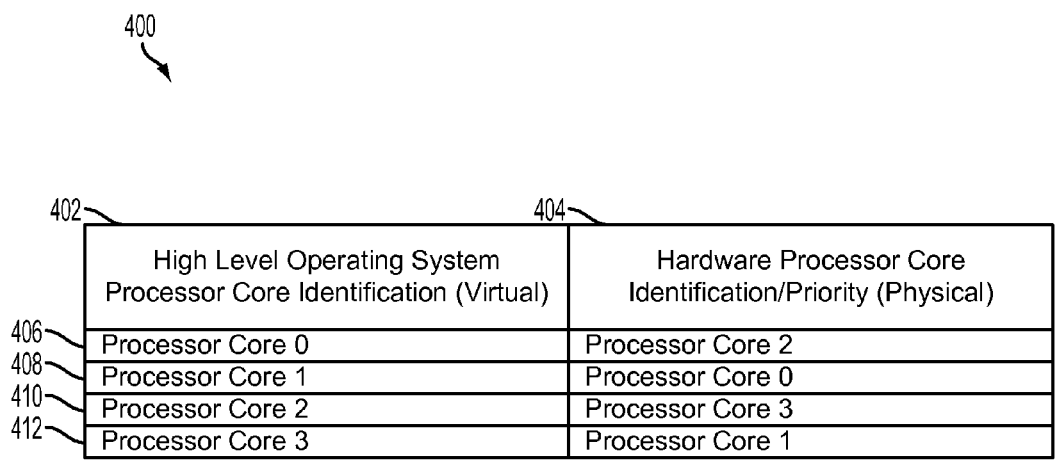
FIG. 4 is an example table relating a high level operating system processor core identification to a hardware processor core priority, for runtime optimization of multi-core system designs for increased operating life and maximized performance, in accordance with an aspect.

FIG. 4 illustrates an example table 400 relating the high level operating system processor core identification to the hardware processor core priority in accordance with an aspect. The table 400 continues the example of the four processor cores (processor cores 0-3) illustrated in FIG. 2. The left column 402 represents the high level operating system processor core identifications, which may be used as virtual identifiers for each of the processor cores selected to be in the group represented in the table 400 (e.g., processor cores 0-3). The right column 404 represents the processor core identifications/priorities, which may list the priorities assigned to each processor core that may be used to order the processor cores selected to be in the group represented in the table 400 (processor cores 0-3), and as physical identifiers for each of these processor cores.

Each row 406, 408, 410, 412 of the table 400 relates to one of the processor cores. For example, the first row 406 relates to processor core 0 as it is identified by the high level operating system. In this example, however, the priorities of the processor cores have been shuffled based on the data gathering and the calculations made by the reliability engine described above. Thus, this example shows that in the first row 406, the high level operating system processor core identification processor core 0 is associated with the hardware processor core identification processor core 2, because processor core 2 has the highest priority. Similarly, the high level operating system processor core identification processor core 1, in a second row 408, is associated with hardware processor core identification processor core 0, because processor core 0 has the next highest priority. The same applies to high level operating system processor core identifications processor core 2 and processor core 3, and hardware processor core identifications processor core 3 and processor core 1, in a third row 410 and a fourth row 412, respectively.

In an aspect, as far as the high level operating system is concerned, when it makes an operation request specifying a high level operating system processor core identification, the high level operating system expects the operation to be executed by the specified processor core. However, the specified processor core may or may not execute the requested process when the priorities of the processor cores have been shuffled according to the gathered data and the calculations made by the reliability engine. The processor core that executes the requested process may be the processor core having the associated hardware processor core identification in table 400. The result of the processing may be the same as if the high level operating system specified processor core executed the request process. The high level operating system may be oblivious to the possibility that a different processor core than the one it specified may have executed the requested process.

The virtual identifiers, physical identifiers, and priorities may be associated with and calculated for groups of processor cores, such that a row of table 400 may represent a group of processor cores, rather than a single processor core.

A result of determining priorities for the processor cores and mapping/reassigning processing tasks according to priority order may be that the processor cores wear more evenly overtime. By reducing the priority of a processor core that demonstrates greater wear by analyzing the collected data related to the processor core, fewer processes and threads will be performed by the processor core. The less work the processor core is tasked to perform, the fewer heat cycles it will experience, reducing the rate at which the core ages. The higher priority processor cores may be assigned more requested processes or threads, and as a result experience more heat cycles, which may cause greater wear on the components of the higher priority processor cores. As the higher priority processor cores exhibit (or calculated to experience) more wear, the priorities assigned to the processor cores by the aspect method will begin to normalize, resulting in a more equal scheduling of requested processes. Spreading requested processes across processor cores in this manner may result in more even wear out of all processor cores, allowing the computing device to function longer at a higher capacity than if one processor core were assigned more task than other cores, or a higher leakage core is tasked the same as other cores, which could lead to one core wearing out and failing before other cores.

Figure 5:
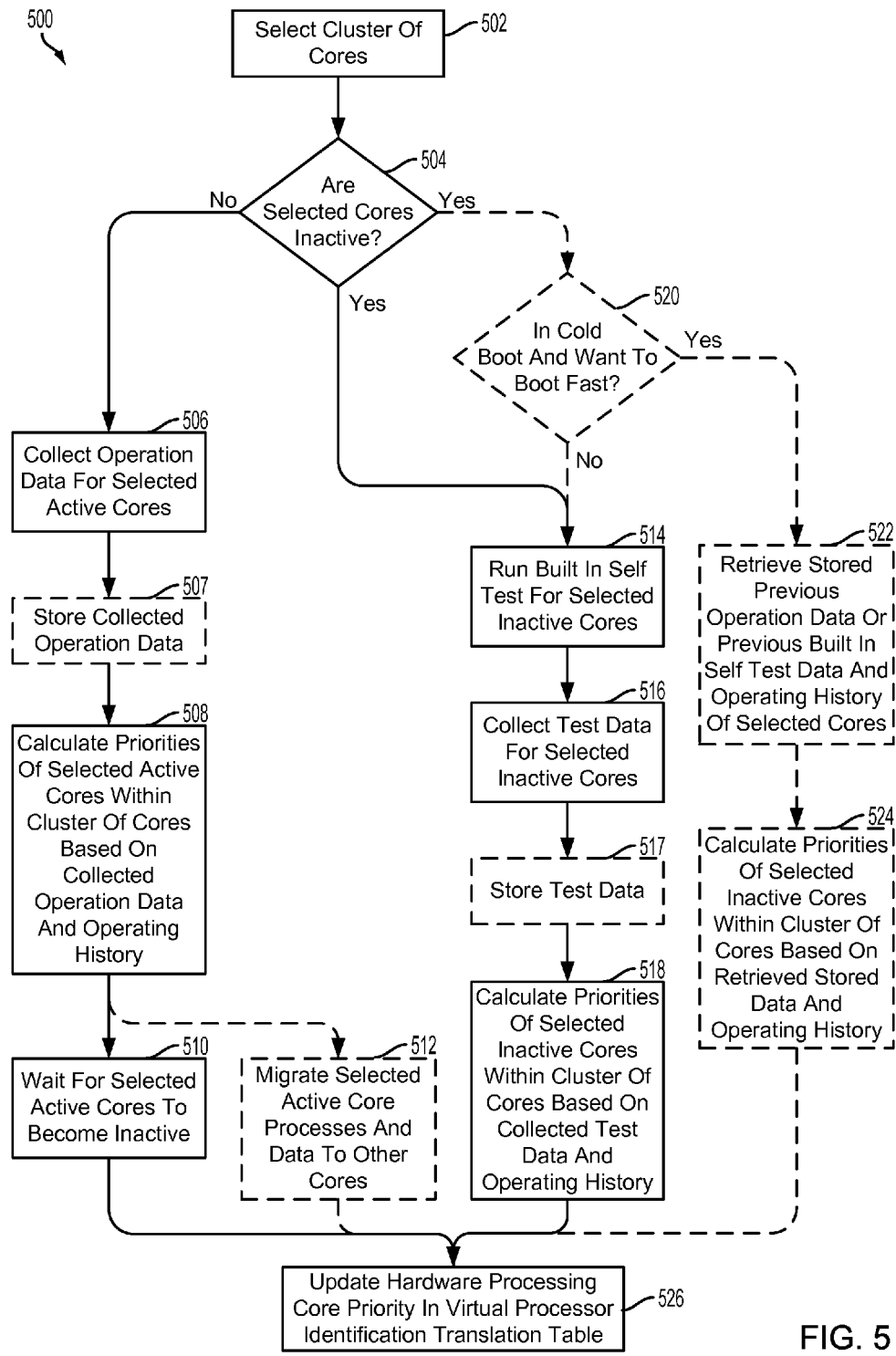
FIG. 5 is a process flow diagram illustrating an aspect method for determining priorities for processor cores.

FIG. 5 illustrates an aspect method 500 for calculating processor core priorities based on information collected from the processor cores. A processor executing the reliability engine may execute the method 500. In block 502 the processor may select a cluster, or group, of equivalent processor cores. As previously described, equivalent processor cores may be configured for the same purpose and to have the same performance characteristics, though the performance characteristics may vary due to manufacturing variability. Thus, the processor may select a group of processor cores configured for the same purpose. For example, the processor may select a group of general purpose processor cores, or groups of graphics or digital signaling processor cores, respectively. When there are multiple equivalent processors, the group of equivalent processor cores may extend across the multiple equivalent processors, or the group may be confined to equivalent processor cores of a single processor.

In determination block 504, the processor may determine whether the selected processor cores are inactive, idle, or in a quiescent state. This determination may affect how the processor implements data gathering and prioritization of the processor cores. When the cores are active, there may not be a need to run a test, because information regarding the processor cores measured from the processor cores' normal activity may be sufficient. Also, prioritizing active processor cores may be a more complex process because active processor cores may be interacting with other components that may expect a particular processor core to be available to execute tasks. When the processor determines that the selected processor cores are active (i.e. determination block 504="No"), the processor may collect operation data for the selected active cores in block 506. In other word, the processor may monitor sensors and collect data from the normal operation of the selected processor cores without running a separate test to obtain readings for the relevant data for the selected processor cores. For example, the processor may monitor the thermal output and the current leakage of the selected processor cores during normal operation.

In optional block 507, this collected operational data and related information may be stored in any nonvolatile memory accessible by the processor, including FLASH memory of the computing device, a storage component configured to store this information, or another component dedicated to tracking and storing data on processor core operational data and cumulative operation time. The operational data stored in non-volatile memory may be used at boot time to set initial processor core priorities and mappings. As part of the data saved in block 507, the operational time or usage of the processor core may be stored in a frequently updated data field. Thus, as part of the operations in block 506, the processor may retrieve from this memory the operational time (i.e., total or relative active time) for the selected processor core.

In block 508 the processor may calculate priorities for each of the selected processor cores based on the collected operation data and operating history. The processor may apply the function or algorithm to the collected data, along with the weighting factors for each of the types of data, for each of the selected processor cores, calculating the new priority values for the selected cores. The function or algorithm used to calculate the priorities may vary. In various aspects, different combinations of one or more of the thermal output, current leakage and operating time, and their weighting factors, may be used to calculate the core priorities. In an aspect the three types of collected data may be multiplied by their respective weighting factors, and the results summed together to produce a priority value for each processor core. In another aspect, when one of the types of data is to be discounted, the weighting value may be set to zero, or the data of the discounted type may be removed from the function or algorithm.

In block 510 the computing device may wait for the selected processor cores to become inactive. As described above, prioritizing active cores may pose problems when components of the computing device expect particular processor cores to be available to execute certain tasks. However, when an expected processor core is prioritized differently from what is expected, it may leave the components without a processor core to execute the expected task, leading to potential errors in operation of the computing device. Thus, the computing device may wait for the processor cores to become inactive, when there are no scheduled or expected tasks for the processor cores, before changing the processor cores' priority in order to avoid negatively affecting the other components.

In another aspect, in optional block 512 the processor may migrate the selected processor cores' current and expected processes and data to one or more other processor cores. Rather than waiting for the selected processor cores to become inactive, the processor may reassign the current and scheduled processes, and the related data, from the selected processor cores to other processor cores that are available. In this aspect, the components of the computing device may continue to operate as expected with processes and data mapped to different processor cores, in essence, forcing the selected processor cores into a quiescent state when the processing demand on the computing device requires less than all processor cores.

In either aspect, whether waiting for the selected processor cores to become inactive or migrating the processes away from the lower priority processor cores, in block 526 the processor may update the hardware processor core priority in the virtual processor identification translation table. As described above, updating the priorities of the selected processor cores results from ordering or reordering the hardware processor core identifications according to their priority values. The numerical order of the resulting priority values may determine the relative priorities of the selected processor cores. In an aspect, the selected processor core with the first or highest priority value may be moved to the top of the virtual processor identification translation table and associated with the high level operating system processor core identification in the first row. The selected processor core with the second priority value may be moved to the second row of the virtual processor identification translation table and associated with the high level operating system processor core identification in the second row, and so on for all of the selected processor cores.

When the processor determines that the selected processor cores are inactive (i.e. determination block 504="Yes"), the processor may run the built in self test for the selected processor cores in block 514. The built in self test may provide a workload for the selected processor cores to execute so that the processor may collect thermal output and current leakage data from the selected processor cores that are relevant for calculating priorities for the processor cores. The built in self test may be run while the selected processor cores are otherwise inactive, idle, or in a quiescent state. In an aspect, the built in self test may be run for the selected processor cores (which may be preselected as a default group of processor cores) during the boot process of the computing device. In block 516 the processor may collect the relevant data for the selected processor cores obtained during their built in self test.

In block optional 517, self test data may be stored in nonvolatile memory accessible by the processor, such as the nonvolatile memory used to store collected operational data in block 507. Storing the self test data in non-volatile memory may enable this information to be used at boot time to set initial processor core priorities and mappings.

The processor may also retrieve the operating time data for the selected processor cores as part of collecting the built in self test data. In block 518 the processor may calculate priorities for each of the selected processor cores based on the collected operation data and operating history in the same manner as in block 508. In block 526 the processor may update the hardware processor core priority in the virtual processor identification translation table as described above.

In another aspect, when the processor determines that the selected processor cores are inactive (i.e. determination block 504="Yes"), in optional determination block 520 the processor may optionally determine whether the computing device is in a cold boot and configured to boot quickly rather than running the built in self test for the selected processor cores in block 514. A cold boot may occur when the computing device boots from a powered down state. When the processor determines that the computing device is either not in a cold boot, or in a cold boot but is not configured to boot fast (i.e. optional determination block 520="No"), the processor may run the built in self test for the selected processor cores in block 514 and proceed as described above.

When the processor determines that computing device is in a cold boot and is configured to boot fast (i.e. optional determination block 520="Yes"), the processor may retrieve stored built in self test data or stored operational data, and the operating history for the selected processor cores from the nonvolatile memory in optional block 522. The nonvolatile memory may be the same memory used to store collected operational data in block 507 and/or the same memory used to store self test data in block 517. In an aspect, it may be possible for the processor to retrieve a combination of stored built in self test data and operational data for the selected processor cores. For example, the stored built in self test data or operational data for the selected processor cores may be incomplete, and the processor may supplement missing data with the other type of data when it is available. The processor may also make a determination that one of the built in self test data or operational data for one or more of the types of data, used in calculating the priorities of the processor cores, may be more recent and determine to user the more recent data for the one or more types of data.

In optional block 524 the processor may calculate priorities for each of the selected processor cores based on the retrieved stored data and operating history in the same manner as in blocks 508 and 518 as described above. In block 526 the processor may update the hardware processor core priority in the virtual processor identification translation table as described above.

In alternative aspects, the computing device or system may be configured so that the processor only uses self tests or run time measurements to determine how to reprioritize processor cores. In aspects that only use self tests, the operations of blocks 504 through 512 may not be performed, and the results of self tests stored in memory in 517 may be used at boot time to set initial processor priorities before the first self test can be performed as described above. In aspects that only use run time measurements to reprioritize processor cores, the operations of block 514 through 524 may not be performed and the results of run time measurements may be saved in nonvolatile storage so that results can be referenced in future boot cycles or during run time. In such aspects, the processor may be configured with a default processor core mapping (e.g., 0=0, 1=1, 2=2, 3=3) that may be used upon an initial boot cycle before sufficient run time measurements have been stored in memory.

Figure 6:
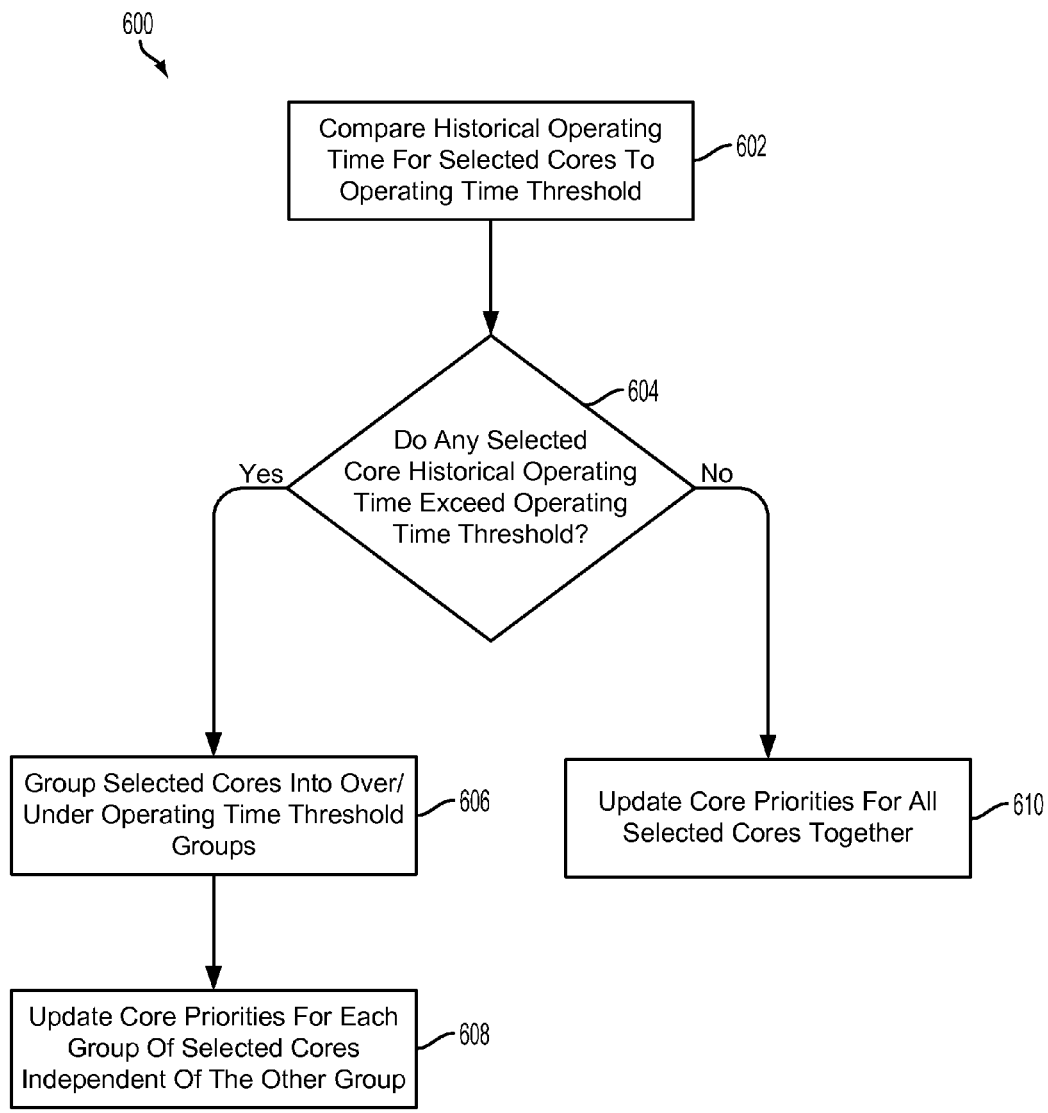
FIG. 6 is a process flow diagram illustrating an aspect method for determining when to update processor core priorities.

FIG. 6 illustrates an aspect method 600 for runtime optimization of multi-core system designs for increased operating life and maximized performance for a system including updated hardware. The processor executing the reliability engine may execute the method 600.

The addition of new processing hardware including new processor cores to the computing device, such as expansion, upgraded, replaced, or later added processor cores 326 illustrated in FIG. 3 (e.g., modem processors, additional or replacement graphics processors (GPUs), additional or replacement audio processors, and additional or replacement DSPs), may create an imbalance in the wear levels between the new processor cores and the older processor cores. Such a later-added/replaced/upgraded set of processor cores could be akin to a second CPU cluster 326 that may be optionally added (e.g., plugged into a pre-existing interface slot) sometime after sale of the computing device. The imbalance may be so great as to greatly prioritize the new processor cores over the older processor cores in an attempt to even the wear on the processor cores. However, this may defeat the purpose of adding new hardware, because new hardware is often added to increase the performance of the computing device by adding supplemental hardware. Prioritizing the new hardware above the old hardware until the hardware use levels even out may have the unintended effect of replacing the old hardware for a period of time rather than supplementing it. Thus, to avoid relying too heavily on the new hardware, in block 602 the processor executing the reliability engine may compare historical operating time for selected cores to an operating time threshold. The operating time threshold may be predetermined or calculated based on operating time data for the new and old processor cores. The operating time threshold may provide a demarcation line as to when new processor cores may be treated the same as the old processor cores. In determination block 604 the processor may determine whether any of the selected processor cores' historical operating time exceeds the operating time threshold. In other words, the processor may check to see whether any of the new processor cores are so new that they have not yet been run sufficiently to be comingled with the older processor cores for the purposes of determining the priority of equivalent processor cores.

When the processor determines that at least one processor core's historical operating time exceeds the operating time threshold (i.e. determination block "604"=Yes), in block 606 the processor may group the selected processor cores into over the threshold (or new) processor cores, and under the threshold (or old) processor cores. In block 608 the processor may execute the method 500 for each of the over the threshold and under the threshold groups of selected processor cores independently of the other group. Thus, for example, in block 602 processor may select either the over the threshold or under the threshold groups of selected processor cores and execute the remaining blocks as described above. The processor may do the same for the group that was not selected first. In this aspect, the old and new processor cores are prioritized separately and compared only to other processor cores of similar ware. Thus, the processor cores in both the old and the new groups may be assigned processing requests from the high level operating system. When the processor determines that none of the processor core's historical operating time exceeds the operating time threshold (i.e. determination block "604"=No), in block 610 the processor may execute the method 500 for all of the selected processor cores together.

The method 600 may be particularly useful in a server environment where the operational times of the multi-core processors of a server are often higher than in a consumer device. Because servers are often employed in a commercial setting where server uptime may be critical to the functions supported by the server, the demand on the multi-core processors may be near constant. Servers are also often configured to be flexibly reconfigured for varying uses and levels of demand by adding, removing and replacing processing hardware. The addition and replacement of processing hardware in a server, such as adding or replacing multi-core processors, allows for servers to perform new tasks, more of the same tasks, or perform tasks better than before the additions. The high operational time of the multi-core processors of a server may result in large disparities between currently employed multi-core processors and newly introduced multi-core processors. As mentioned above, server systems may include compute servers, data servers, telecommunication infrastructure rack servers, video distribution servers, application specific servers, etc. Implementing method 600 in a server environment may increase the reliability of the servers resulting in a higher uptime, which is a critical aspect for server service providers and those who rely on server access.

Figure 7:
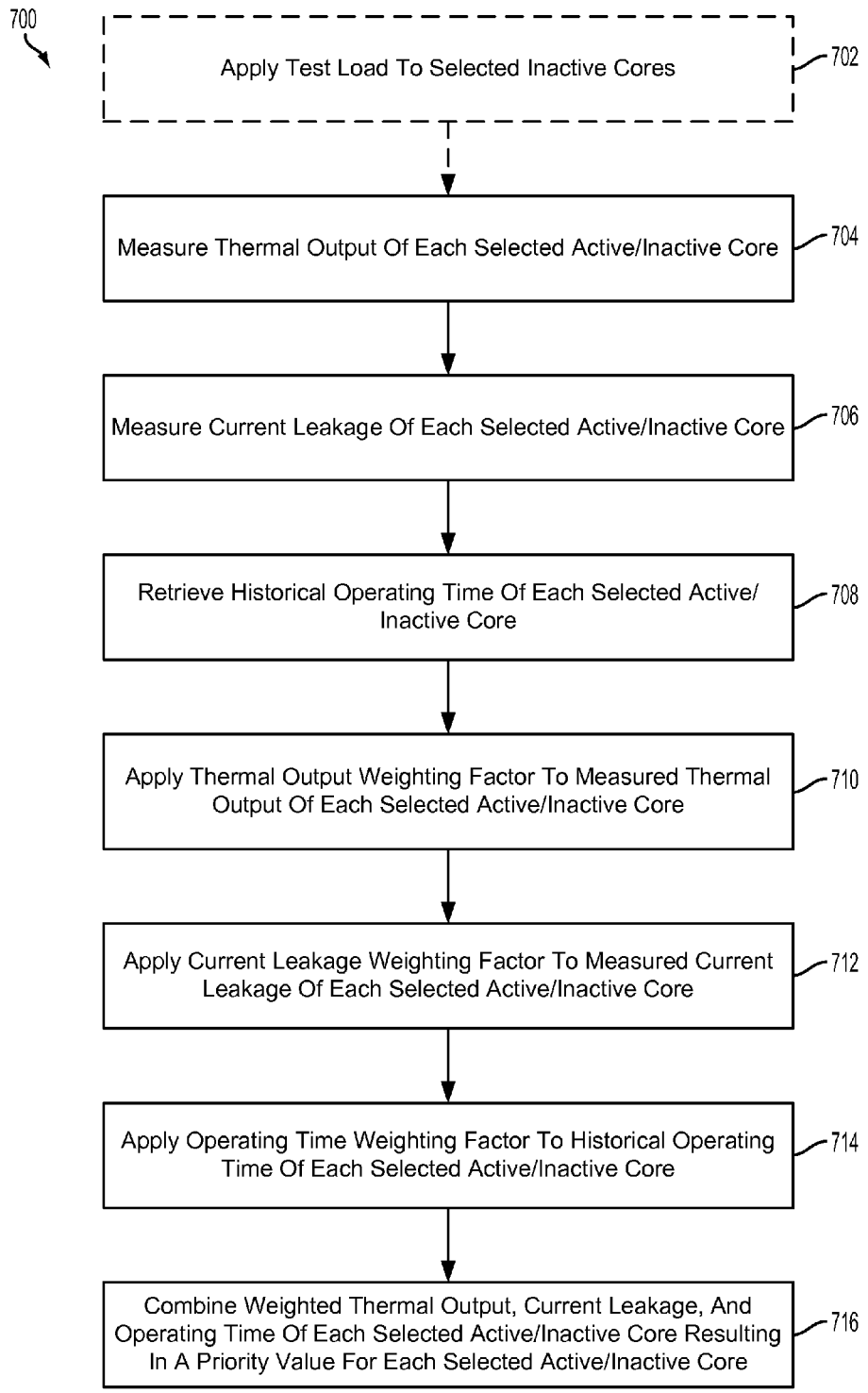
FIG. 7 is a process flow diagram illustrating an aspect method for collecting test/operation data and calculating processor core priorities.

FIG. 7 illustrates an aspect method 700 for collecting test/operation data and calculating processor core priorities. The processor executing the reliability engine may execute the method 700. This method 700 describes operations for collecting test/operation data and calculating processor core priorities in blocks 506, 508, 514 and 516 of method 500 described above with reference to FIG. 5. When the processor determines that the selected processor cores are inactive in determination block 504 (i.e., determination block 504 in method 500="Yes"), the processor may apply a test workload to the selected processor cores in block 702. The test workload may be a predetermined workload designed to cause certain behaviors in the processor cores. For example, the test workload may attempt to incite a normal work response from the processor cores by providing a normal workload. Similarly, the test workload may attempt to incite a heavy work response from the processor cores by providing them with a heavy workload of tasks. Different workloads may be designated for different types of processor cores, such as a graphic processing workload for graphics processor cores.

In block 704 the processor may measure the thermal output of each selected processor core based on data gathered during the self test in block 702 or based on data gathered from normal operations of the processor cores when the cores are active (i.e., determination block 504 in method 500="No"). For example, temperature data may be obtained from thermal sensors that may be strategically placed on a die of the multi-core processors containing the processor cores. Analysis of temperature data from a number of sensors may be used to calculate the thermal output of the individual processor cores. In an aspect in which the processor cores are placed so closely together that the thermal output of one or more of the processor cores affects another of the processor cores, it may be sufficient to observer the thermal output of the group of processor cores rather than each processor core individually. In such an aspect, it may be possible to reduce the number of thermal sensors required per processor core to observer the thermal output.

In block 706 the processor may measure the current leakage of each selected processor core. Current or voltage sensors may be strategically placed on a die of the multi-core processors containing the processor cores such that the voltage drop through the core or the amount of current consumed by the core may be observed and recorded. The current leakage may also be calculated based on the thermal output of the individual processor cores that may be observed using temperature sensors.

In block 708 the processor may retrieve the historical operating time of each selected processor core. As described above, the historical operating time may be retrieved from the memory, the storage component, the multi-core processor, or some other component dedicated to tracking and recording the historical operating time of the processor cores. The historical operating time may be presented in a number of different manners. In an aspect, the historical operating time may include a count value of the amount of time a processor core has been active (referred to herein as the "active time"). In an aspect, the historical operating time may include a relative active time value for the processor core that is based on a comparison (or relative measure) of the active time on the core compared the amount of active time of the other equivalent processor cores. For example, the historical operating time may be a percentage of the total operating time of all of the equivalent processor cores for which a particular operating core has been active.

In block 710 the processor may apply the thermal output weighting factor to the measured thermal output of each of the selected processor cores. In block 712 the processor may apply the current leakage weighting factor to the measured current leakage of each of the selected processor cores. In block 714 the processor may apply the operating time weighting factor to the historical operating time of each of the selected processor cores. For each of the weighting factors, the weighting factor may remain the same across the equivalent processor cores. For example, the thermal output weighting factor may be the same for each of the equivalent processor cores. In an aspect, the weighting factors may be the same or may vary for nonequivalent processor cores. For example, the thermal output weighting factor may or may not be the same for a general processor core as compared to a graphics processor core. In various aspects, applying the weighting factor to the measured or historical values may include using one or more of any number of mathematical operations. For example, the measured or historical values may be multiplied by their respective weighting factors.

In block 716 the processor may combine the weighted thermal output, the weighted current leakage, and/or the weighted historical operating time of each selected processor core individually, resulting in the priority value for each selected processor core. As described above, the combination of these values may be accomplished in a variety of forms. In various aspects, some or all of these values may be combined to produce the priority values for each selected processor core. In some aspects, some of the values may not be included in the combination by either not combining the discarded value through a mathematical operation with the other values, or by discounting the value by cancelling the value out using its respective weighting factor.

It should be noted that the different types of operational information regarding processor cores may be independent and thus may be obtained and processed in any order, and not necessarily in the order in which the operations are illustrated in FIG. 7. For example, a processor could sample current leakage upon boot up or system initialization only, and obtain temperature/thermal measurements periodically (e.g., hourly) thereafter and as part of normal operations. Therefore, the sequence of operations illustrated in FIG. 7 is for illustration purposes only and is not intended to limit the scope of the claims.

Figure 8:
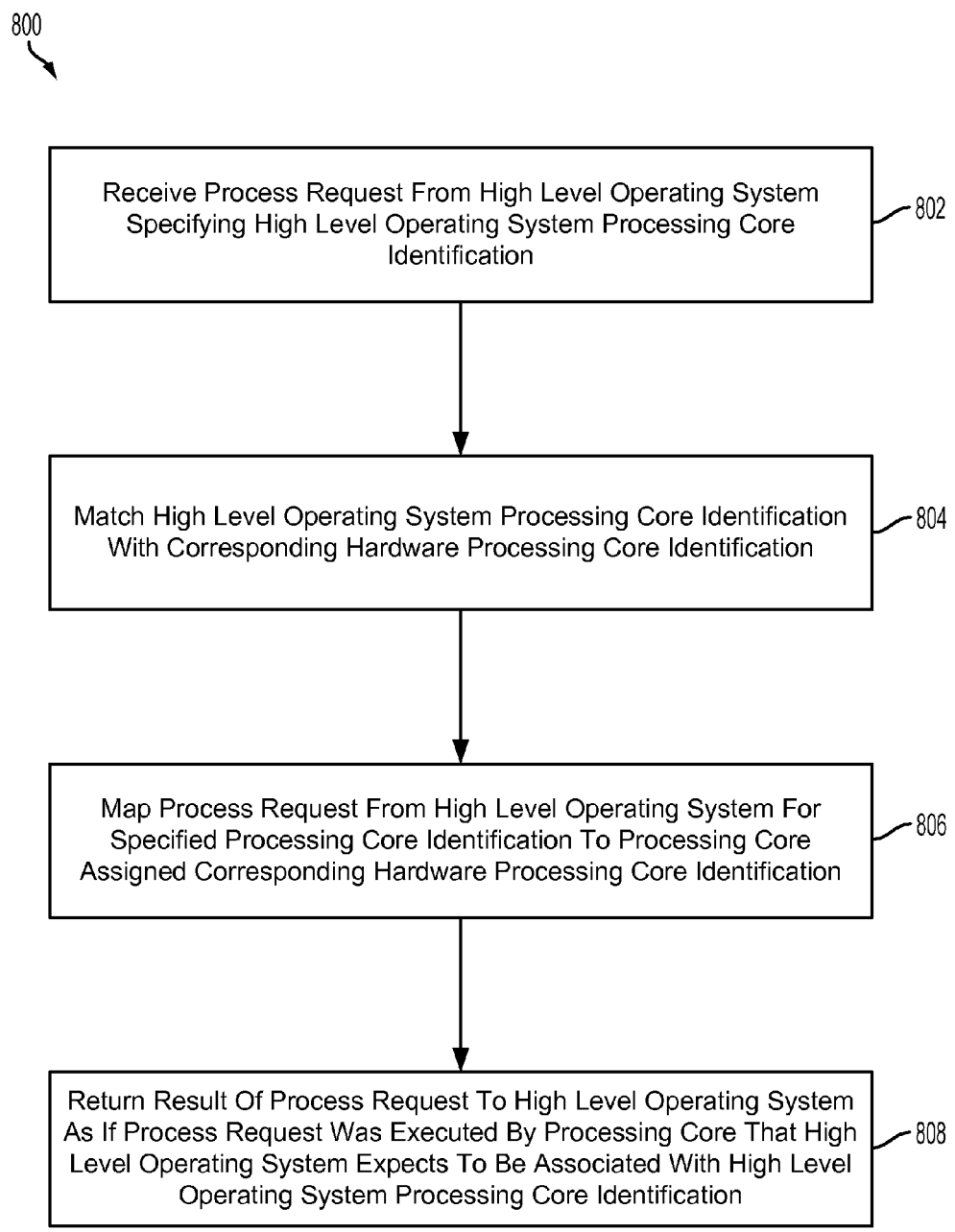
FIG. 8 is a process flow diagram illustrating an aspect method for translating a high level operating system processor core identification to a hardware processor core priority.

FIG. 8 illustrates an aspect method 800 for translating a high level operating system processor core identification to a hardware processor core priority. The processor executing the reliability engine may execute the method 800. In block 802 the processor may receive a process request from the high level operating system specifying a high level operating system processor core identification. In doing so, the high level operating system is expecting that the processor core identified by the high level operating system processor core identification will be assigned the process request. For example, an original pairing of virtual and physical processor core identifiers may pair virtual identifier processor core 0 with physical identifier processor core 0. However, if the processor cores are prioritized as illustrated in the priorities table in FIG. 4, the virtual identifier processor core 0 may be paired with physical identifier processor core 2.

In block 804 the processor may match the high level operating system processor core identification with the corresponding hardware processor core identification according to its priority. When the processor cores are prioritized and no longer matched with their original pairing of the high level operating system processor core identification, the processor may make the connection between the high level operating system processor core identification and the newly prioritized processor cores so that the process request made by the high level operating system is mapped to a processor core, and more specifically the appropriate processor core. However, the appropriate processor core may no longer be the processor core the high level operating system expects.

In block 806 the processor may map the process request from the high level operating system for the specified processor core identification to the processor core assigned the corresponding hardware processor core identification. The processor may map the processing request to the processor core now associated with the requested virtual processor core identifier. The associated processor core may be the processor core to execute the process request.

In block 808 the processor may return the result of the process request to the high level operating system as if the process request had been executed by the processor core identified by the high level operating system in the process request. By not informing the high level operating system of the change of priorities of the processor cores and managing the process requests without the high level operating system having to adjust for the changes may eliminate a layer of complexity in the high level operation system, and reduce costs that might otherwise be necessary to implement the aspects in the operating system.

FIG. 9 illustrates an aspect method 900 for updating weighting values for use in runtime optimization of multi-core system designs for increased operating life and maximized performance. A computer within the manufacturer may execute at least some operations of the method 900. Manufactures may learn about performance characteristics of the processor cores during manufacturing and then use the data to adjust the processor cores in use to rectify issues, such as inefficiencies and uneven heat cycling, that were not detected during testing phases of the processor cores. For example, as a manufacturer ramps up production of integrated circuits in a new process, the manufacturer typically learns things about variability and performance of processor cores during the tuning of the wafer fabrication process. Such learning may lead the manufacturer to revise already fielded devices, such as by transmitting updated parameters in over-the-air updates for computing devices implementing integrated circuits from previously fabricated lots. As another example, failed consumer products may be returned to the manufacturer, such as according to the well-known Return Merchandise Authorization (RMA) process. Returned merchandise may be analyzed to discover a pattern of issues that lead to device failures that prompted the merchandise returns. Through the analysis of failures in returned merchandise the manufacturer may determine that it can improve the failure rates and longevity of its processor cores by updating the weighting values to alter the wear on the processor cores.

In block 902 the manufacturer may receive and analyze returned merchandise to determine causes of failures and failure rate data. This data may include customer comments and technical analysis of potentially defective or broken processor cores obtained pursuant to the RMA process. In an aspect, in block 904 the manufacturer may also receive operation and test data of the processor cores from functioning computing devices via communications over a wired or wireless connection.

In block 906 the manufacturer may analyze the return merchandise analysis data and operation and test data if received to determine causes of component failures. In block 908 the manufacturer may determine updates for one or more of the weighting factors for the processor cores using the received data that may avoid the causes of the failures of the components. The weighting factors may be modified to place greater or less importance on one or more of the data relating to the processor cores to skew the prioritization of cores in a manner that is expected to lead to better or more even wearing of the processor cores.

In block 910 the manufacturer may send the updated weighting factors to the computing device over a wired or wireless connection, such as in the form of an over-the-air update to a computing device, an in-store update accomplished by a technician, or an update that is downloaded from an Internet server to a computing device (e.g., a desktop or laptop computer) over a wired or wireless network connection to the Internet. Sending such updates may be accomplished using a targeted or broadcast push of data to the computing device, or the computing device may be notified of the update and requested to download (i.e., pull) the update from an Internet server.

FIG. 10 is a process flow diagram illustrating an aspect method for updating weighting values for use in runtime optimization of multi-core system designs for increased operating life and maximized performance. In an associated method 1000 to method 900, the computing device may send and receive data to the manufacturer in order to update the weighting values.

In block 1002 the computing device may send operation and test data to the manufacturer over a wireless connection. Sending this data may be optional because either the computing device and/or the manufacturer is not setup for the transmission of this data, or optional as a user option on the computing device.

In block 1004 the computing device may receive the updated weighting factors for one or more of the thermal output, the current leakage, and the operating time. The received updated weighting factors may be dependent on the updated weighting factors sent or made available to the computing device, and/or the updated weighting factors accepted by the computing device and/or user.

In block 1006 the processor executing the reliability engine may replace the weighting factors with the update weighting factors. In an aspect, some or all of the old weighting factors may be deleted, disassociated from their pointers, or overwritten when updated with the new weighting factors. The updated factors may be used at the next time the processor cores are prioritized.

Figure 11:
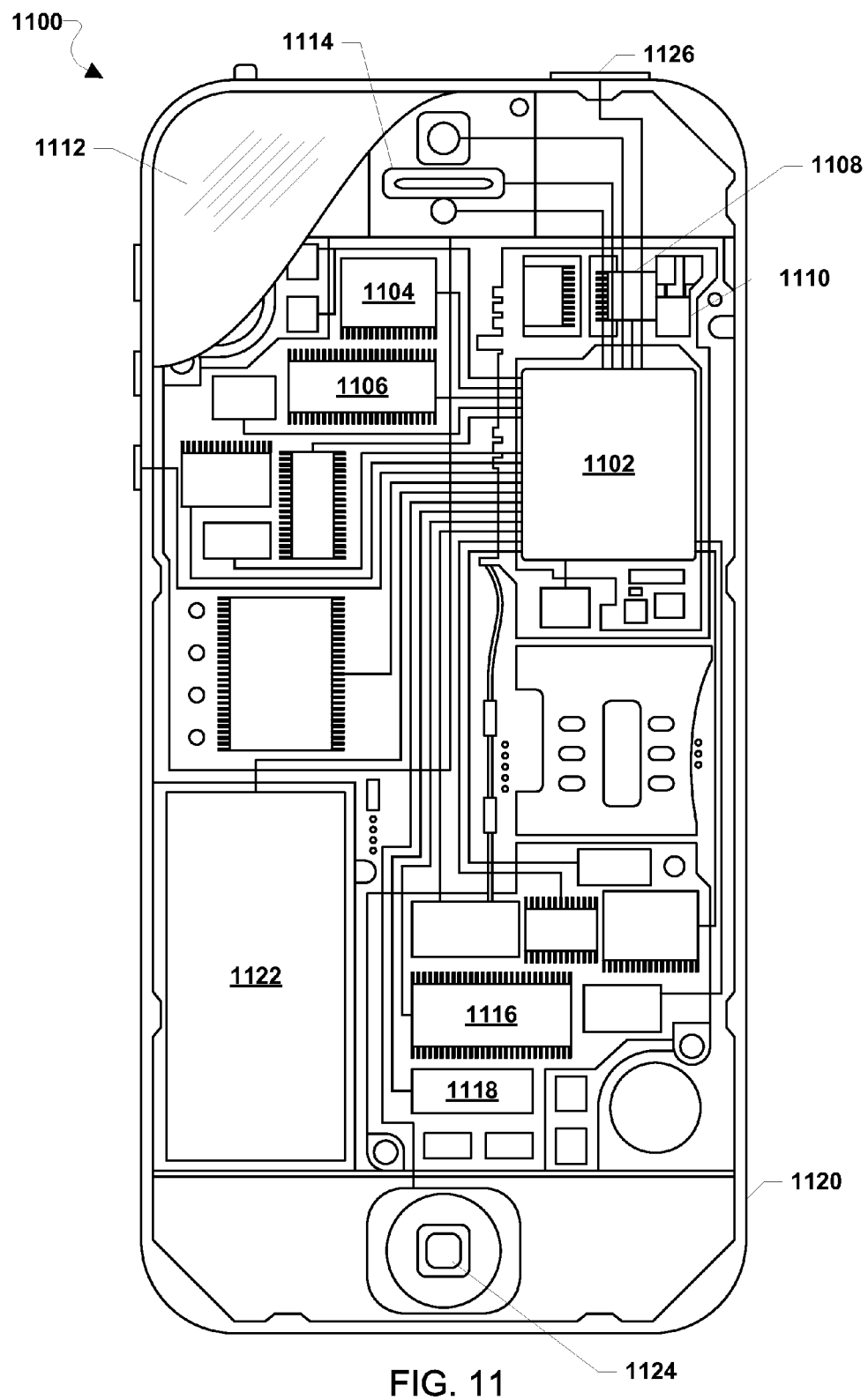
FIG. 11 is component block diagram illustrating an example of a computing device suitable for use with the various aspects.

FIG. 11 illustrates an example of a computing device suitable for implementing the various aspects in the form of a smartphone. A smartphone computing device 1100 may include a multi-core processor 1102 coupled to a touchscreen controller 1104 and an internal memory 1106. The multi-core processor 1102 may be one or more multi-core integrated circuits designated for general or specific processing tasks. The internal memory 1106 may be volatile or non-volatile memory, and may also be secure and/or encrypted memory, or unsecure and/or unencrypted memory, or any combination thereof. The touchscreen controller 1104 and the multi-core processor 1102 may also be coupled to a touchscreen panel 1112, such as a resistive-sensing touchscreen, capacitive-sensing touchscreen, infrared sensing touchscreen, etc. Additionally, the display of the computing device 1100 need not have touch screen capability.

The smartphone computing device 1100 may have one or more radio signal transceivers 1108 (e.g., Peanut, Bluetooth, Zigbee, Wi-Fi, RF radio) and antennae 1110, for sending and receiving communications, coupled to each other and/or to the multi-core processor 1102. The transceivers 1108 and antennae 1110 may be used with the above-mentioned circuitry to implement the various wireless transmission protocol stacks and interfaces. The smartphone computing device 1100 may include a cellular network wireless modem chip 1116 that enables communication via a cellular network and is coupled to the processor.

The smartphone computing device 1100 may include a peripheral device connection interface 1118 coupled to the multi-core processor 1102. The peripheral device connection interface 1118 may be singularly configured to accept one type of connection, or may be configured to accept various types of physical and communication connections, common or proprietary, such as USB, FireWire, Thunderbolt, or PCIe. The peripheral device connection interface 1118 may also be coupled to a similarly configured peripheral device connection port (not shown).

The smartphone computing device 1100 may also include speakers 1114 for providing audio outputs. The smartphone computing device 1100 may also include a housing 1120, constructed of a plastic, metal, or a combination of materials, for containing all or some of the components discussed herein. The smartphone computing device 1100 may include a power source 1122 coupled to the multi-core processor 1102, such as a disposable or rechargeable battery. The rechargeable battery may also be coupled to the peripheral device connection port to receive a charging current from a source external to the smartphone computing device 1100. The smartphone computing device 1100 may also include a physical button 1124 for receiving user inputs. The smartphone computing device 1100 may also include a power button 1126 for turning the smartphone computing device 1100 on and off.

Figure 12:
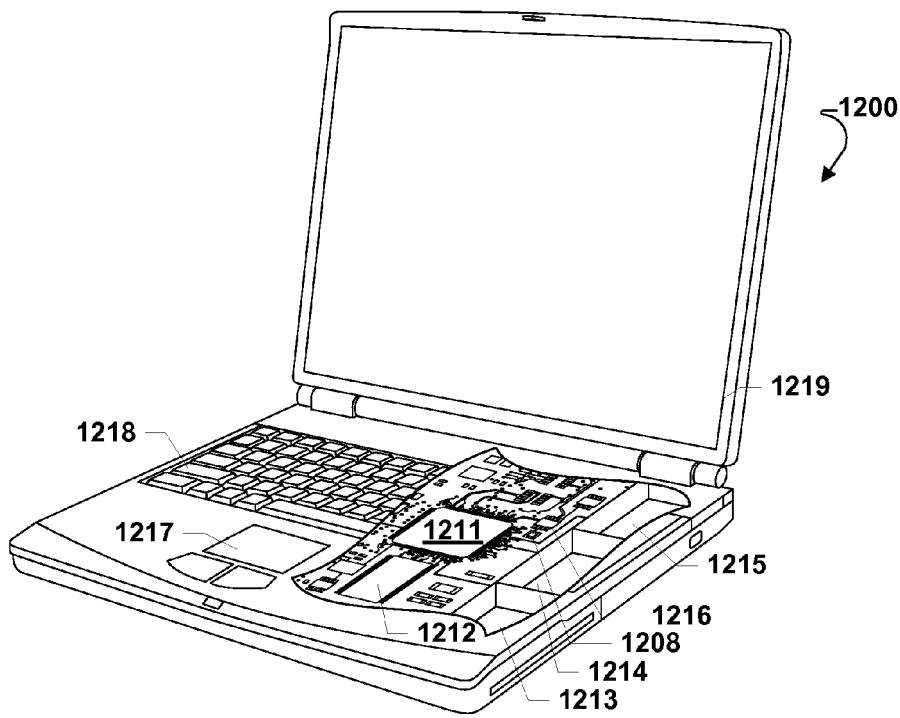
FIG. 12 is component block diagram illustrating another example computing device suitable for use with the various aspects.

The various aspects described above may also be implemented within a variety of other computing devices, such as a laptop computer 1200 illustrated in FIG. 12. Many laptop computers include a touchpad touch surface 1217 that serves as the computer's pointing device, and thus may receive drag, scroll, and flick gestures similar to those implemented on computing devices equipped with a touch screen display and described above. A laptop computer 1200 will typically include a multi-core processor 1211 coupled to volatile memory 1212 and a large capacity nonvolatile memory, such as a disk drive 1213 of Flash memory. Additionally, the computer 1200 may have one or more antenna 1208 for sending and receiving electromagnetic radiation that may be connected to a wireless data link and/or cellular telephone transceiver 1216 coupled to the multi-core processor 1211. The computer 1200 may also include a floppy disc drive 1214 and a compact disc (CD) drive 1215 coupled to the multi-core processor 1211. In a notebook configuration, the computer housing includes the touchpad 1217, the keyboard 1218, and the display 1219 all coupled to the multi-core processor 1211. Other configurations of the computing device may include a computer mouse or trackball coupled to the processor (e.g., via a USB input) as are well known, which may also be use in conjunction with the various aspects. A desktop computer may similarly include these computing device components in various configurations, including separating and combining the components in one or more separate but connectable parts.

Figure 13:
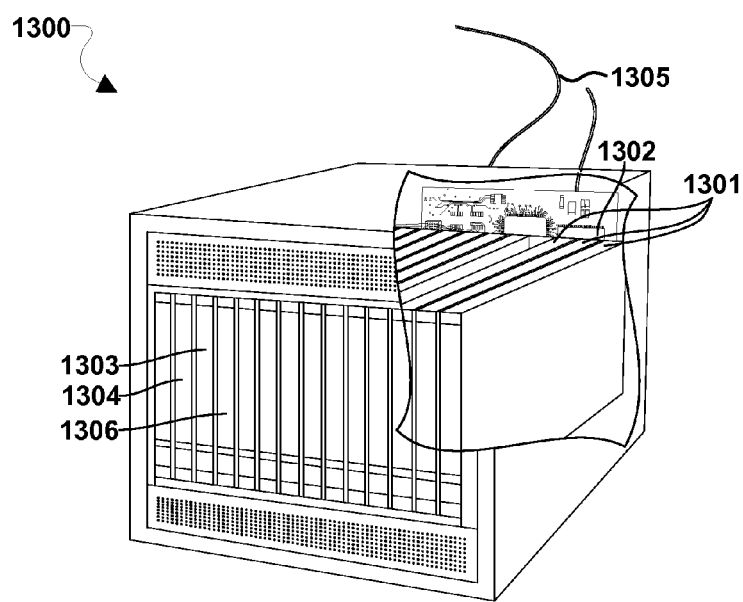
FIG. 13 is component block diagram illustrating an example server device suitable for use with the various aspects.

The various aspects may also be implemented on any of a variety of commercially available server devices, such as the server 1300 illustrated in FIG. 13. Such a server 1300 typically includes one or more multi-core processor assemblies 1301 coupled to volatile memory 1302 and a large capacity nonvolatile memory, such as a disk drive 1304. As illustrated in FIG. 13, multi-core processor assemblies 1301 may be added to the server 1300 by inserting them into the racks of the assembly. The server 1300 may also include a floppy disc drive, compact disc (CD) or DVD disc drive 1306 coupled to the processor 1301. The server 1300 may also include network access ports 1303 coupled to the multi-core processor assemblies 1301 for establishing network interface connections with a network 1305, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (in which non-privileged code runs) and a kernel space (in which privileged code runs). This separation is of particular importance in Android and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc, wherein disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of assigning processing tasks to processor cores within a multi-core processor in order to extend an operating life of the multi-core processor, comprising:

obtaining information relevant to wear out regarding each of the processor cores within the multi-core processor calculating a priority for each of the processor cores based on the obtained information relevant to wear out;

receiving a process request from a high level operating system specifying a high level operating system processor core identifier for a first processor core of the multi-core processor; and mapping the process request to a second processor core corresponding to a physical identifier associated with the high level operating system processor core identifier based on the calculated priorities for the processor cores.

2. The method according to claim 1, wherein obtaining information relevant to wear out regarding each of the processor cores within the multi-core processor comprises measuring one or more of a temperature, cumulative usage, and a current leakage of the processor cores under normal operations.

3. The method according to claim 1, wherein obtaining information relevant to wear out regarding each of the processor cores within the multi-core processor comprises:
determining whether the processor cores are active;
providing a test workload to each of the processor cores in response to determining that the processor cores are inactive;
measuring one or more of thermal output and current leakage of the processor cores under the test workload individually or for groups of the processor cores in response to providing the test workload;
measuring one or more of thermal output and current leakage of the processor cores under normal operation individually or for groups of processor cores in response to determining that the processor cores are active; and
retrieving historical operating time for each of the processor cores.

4. The method according to claim 3, wherein calculating a priority for each of the processor cores based on the obtained information relevant to wear out comprises calculating the priority for each of the processor cores by multiplying weighting factors times the measured thermal output, the measured current leakage, and the historical operating time and summing the products.

5. The method of claim 4, further comprising:
receiving over a network connection updated weighting factors; and
updating the weighting factors used in calculating a priority for each of the processor cores with the updated weighting factors.

6. The method of claim 1,
further comprising returning a result of the process request to the high level operating system as if the first processor core generated the result of the process request.

7. The method of claim 6, further comprising:
determining whether a historical operating time for any of the processor cores exceeds an operating time threshold;
grouping those processor cores that exceed the operating time threshold into a first group of processor cores and grouping those processor cores that do not exceed the operating time threshold into a second group of processor cores; and
ordering associations between virtual identifiers for each of the processor cores and each of the processor cores according to the priorities calculated for each of the processor cores for the first group of processor cores separately from associations for the second group of processor cores.

8. The method of claim 1, further comprising:
ordering associations between high level operating system processor core identifiers for each of the processor cores and physical identifiers for each of the processor cores according to the priorities calculated for each of the processor cores, wherein the high level operating system processor core identifier for the first processor core is associated with the physical identifier corresponding to the second processor core.

9. The method of claim 8, further comprising:
determining whether a historical operating time for any of the processor cores exceeds an operating time threshold; and
grouping those processor cores that exceed the operating time threshold into a first group of processor cores and grouping those processor cores that do not exceed the operating time threshold into a second group of processor cores,
wherein ordering associations between high level operating system processor core identifiers for-each of the processor cores and physical identifiers for each of the processor cores according to the priorities calculated for each of the processor cores comprises ordering associations for the first group of processor cores separately from associations for the second group of processor cores.

10. A computing device, comprising a multi-core processor having multiple processor cores, the multi-core processor configured with processor-executable instructions to perform operations comprising:
obtaining information relevant to wear out regarding each of the processor cores within the multi-core processor;
calculating a priority for each of the processor cores based on the obtained information relevant to wear out;
receiving a process request from a high level operating system specifying a high level operating system processor core identifier for a first processor core of the multi-core processor; and
mapping the process request to a second processor core corresponding to a physical identifier associated with the high level operating system processor core identifier based on the calculated priorities for the processor cores.

11. The computing device of claim 10, wherein the multi-core processor is configured with processor-executable instructions to perform operations such that obtaining information relevant to wear out regarding each of the processor cores within the multi-core processor comprises:
determining whether the processor cores are active;
providing a test workload to each of the processor cores in response to determining that the processor cores are inactive;
measuring one or more of thermal output and current leakage of the processor cores under the test workload individually or for groups of processor cores in response to providing the test workload;
measuring one or more of thermal output and current leakage of the processor cores under normal operation individually or for groups of processor cores in response to determining that the processor cores are active; and
retrieving historical operating time for each of the processor cores.

12. The computing device of claim 11, wherein the multi-core processor is configured with processor-executable instructions to perform operations such that calculating a priority for each of the processor cores based on the obtained information relevant to wear out comprises calculating the priority for each of the processor cores by multiplying weighting factors times the measured thermal output, the measured current leakage, and the historical operating time and summing the products.

13. The computing device of claim 12, wherein the multi-core processor is configured with processor-executable instructions to perform operations further comprising:
receiving over a network connection updated weighting factors; and
updating the weighting factors used in calculating a priority for each of the processor cores with the updated weighting factors.

14. The computing device of claim 10, wherein the multi-core processor is configured with processor-executable instructions to perform operations further comprising:
associating the high level operating system processor core identifier for the first processor core with the second processor core according to the calculated priority for the second processor core;
and
returning a result of the process request to the high level operating system as if the first processor core generated the result of the process request.

15. The computing device of claim 14, wherein the multi-core processor is configured with processor-executable instructions to perform operations further comprising ordering associations between high level operating system processor core identifiers for each of the processor cores and physical identifiers for each of the processor cores according to the priorities calculated for each of the processor cores,
wherein associating the high level operating system processor core identifier for the first processor core with the second processor core according to the calculated priority for the second processor core comprises associating the high level operating system processor core identifier for the first processor core with the physical identifier for the second processor core.

16. The computing device of claim 15, wherein the multi-core processor is configured with processor-executable instructions to perform operations further comprising:
determining whether a historical operating time for any of the processor cores exceeds an operating time threshold; and
grouping those processor cores that exceed the operating time threshold into a first group of processor cores and grouping those processor cores that do not exceed the operating time threshold into a second group of processor cores,
wherein ordering associations between high level operating system processor core identifiers for each of the processor cores and physical identifiers for each of the processor cores according to the priorities calculated for each of the processor cores comprises ordering associations for the first group of processor cores separately from associations for the second group of processor cores.

17. A computing device having a multi-core processor with multiple processor cores comprising:
means for obtaining information relevant to wear out regarding each of the processor cores within the multi-core processor;
means for calculating a priority for each of the processor cores based on the obtained information relevant to wear out;
means for receiving a process request from a high level operating system specifying a high level operating system processor core identifier for a first processor core of the multi-core processor; and
means for mapping the process request to a second processor core corresponding to a physical identifier associated with the high level operating system processor core identifier based on the calculated priorities for the processor cores.

18. The computing device of claim 17, wherein means for obtaining information relevant to wear out regarding each of the processor cores within the multi-core processor comprises:
means for determining whether the processor cores are active;
means for providing a test workload to each of the processor cores in response to determining that the processor cores are inactive;
means for measuring one or more of thermal output and current leakage of the processor cores under the test workload individually or for groups of processor cores in response to providing the test workload;
means for measuring one or more of thermal output and current leakage of the processor cores under normal operation individually or for groups of processor cores in response to determining that the processor cores are active; and
means for retrieving historical operating time for each of the processor cores.

19. The computing device of claim 18, wherein means for calculating a priority for each of the processor cores based on the obtained information relevant to wear out comprises means for calculating the priority for each of the processor cores by multiplying weighting factors times the measured thermal output, the measured current leakage, and the historical operating time and summing the products.

20. The computing device of claim 19, further comprising:
means for receiving over a network connection updated weighting factors; and
means for updating the weighting factors used in calculating a priority for each of the processor cores with the updated weighting factors.

21. The computing device of claim 17, further comprising:
means for associating the high level operating system processor core identifier for the first processor core with the second processor core according to the calculated priority for the second processor core;
and
means for returning a result of the process request to the high level operating system as if the first processor core generated the result of the process request.

22. The computing device of claim 21, further comprising means for ordering associations between high level operating system processor core identifiers for each of the processor cores and physical identifiers for each of the processor cores according to the priorities calculated for each of the processor cores,
wherein means for associating the high level operating system processor core identifier for the first processor core with the second processor core according to the calculated priority for the second processor core comprises means for associating the high level operating system processor core identifier for the first processor core with the physical identifier for the second processor core.

23. The computing device of claim 22, further comprising:
means for determining whether a historical operating time for any of the processor cores exceeds an operating time threshold; and
means for grouping those processor cores that exceed the operating time threshold into a first group of processor cores and grouping those processor cores that do not exceed the operating time threshold into a second group of processor cores,
wherein means for ordering associations between high level operating system processor core identifiers for each of the processor cores and physical identifiers for each of the processor cores according to the priorities calculated for each of the processor cores comprises means for ordering associations for the first group of processor cores separately from associations for the second group of processor cores.

24. A non-transitory processor-readable medium having stored thereon processor-executable instructions configured to cause a multi-core processor to perform operations comprising:
obtaining information relevant to wear out regarding each of the processor cores within the multi-core processor;
calculating a priority for each of the processor cores based on the obtained information relevant to wear out;
receiving a process request from a high level operating system specifying a high level operating system processor core identifier for a first processor core of the multi-core processor; and
mapping the process request to a second processor core corresponding to a physical identifier associated with the high level operating system processor core identifier based on the calculated priorities for the processor cores.

25. The non-transitory processor-readable medium of claim 24, wherein the stored processor-executable instructions are configured to cause the multi-core processor to perform operations such that obtaining information relevant to wear out regarding each of the processor cores within the multi-core processor comprises:
determining whether the processor cores are active;
providing a test workload to each of the processor cores in response to determining that the processor cores are inactive;
measuring one or more of thermal output and current leakage of the processor cores under the test workload individually or for groups of processor cores in response to providing the test workload;
measuring one or more of thermal output and current leakage of the processor cores under normal operation individually or for groups of processor cores in response to determining that the processor cores are active; and
retrieving historical operating time for each of the processor cores.

26. The non-transitory processor-readable medium of claim 25, wherein the stored processor-executable instructions are configured to cause the multi-core processor to perform operations such that calculating a priority for each of the processor cores based on the obtained information relevant to wear out comprises calculating the priority for each of the processor cores by multiplying weighting factors times the measured thermal output, the measured current leakage, and the historical operating time and summing the products.

27. The non-transitory processor-readable medium of claim 26, wherein the stored processor-executable instructions are configured to cause the multi-core processor to perform operations further comprising:
receiving over a network connection updated weighting factors; and
updating the weighting factors used in calculating a priority for each of the processor cores with the updated weighting factors.

28. The non-transitory processor-readable medium of claim 24, wherein the stored processor-executable instructions are configured to cause the multi-core processor to perform operations further comprising:
associating the high level operating system processor core identifier for the first processor core with the second processor core according to the calculated priority for the second processor core;
and
returning a result of the process request to the high level operating system as if the first processor core generated the result of the process request.

29. The non-transitory processor-readable medium of claim 28, wherein the stored processor-executable instructions are configured to cause the multi-core processor to perform operations further comprising ordering associations between high level operating system processor core identifiers for each of the processor cores and physical identifiers for each of the processor cores according to the priorities calculated for each of the processor cores,
wherein associating the high level operating system processor core identifier for the first processor core with the second processor core according to the calculated priority for the second processor core comprises associating the high level operating system processor core identifier for the first processor core with the physical identifier for the second processor core.

30. The non-transitory processor-readable medium of claim 29, wherein the stored processor-executable instructions are configured to cause the multi-core processor to perform operations further comprising:
determining whether a historical operating time for any of the processor cores exceeds an operating time threshold; and
grouping those processor cores that exceed the operating time threshold into a first group of processor cores and grouping those processor cores that do not exceed the operating time threshold into a second group of processor cores,
wherein ordering associations between high level operating system processor core identifiers for each of the processor cores and physical identifiers for each of the processor cores according to the priorities calculated for each of the processor cores comprises ordering associations for the first group of processor cores separately from associations for the second group of processor cores.

* * * * *